United States Patent
Pachore et al.

(10) Patent No.: US 10,377,218 B1
(45) Date of Patent: Aug. 13, 2019

(54) REINFORCED HEEL KICK ASSEMBLY AND HEEL KICK REINFORCEMENT METHOD

(71) Applicant: Ford Global Technologies, LLC, Dearborn, MI (US)

(72) Inventors: Vijay Pachore, Troy, MI (US); Sean Timothy Ryan, Farmington Hills, MI (US); Jamil Alwan, Ann Arbor, MI (US); Deepak Patel, Canton, MI (US); Peyman Aghssa, Ann Arbor, MI (US); Daniel Grabowski, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/002,381

(22) Filed: Jun. 7, 2018

(51) Int. Cl.
| | |
|---|---|
| *B60K 1/04* | (2019.01) |
| *B62D 25/20* | (2006.01) |
| *B62D 21/03* | (2006.01) |
| *B62D 21/15* | (2006.01) |
| *B60K 6/22* | (2007.10) |

(52) U.S. Cl.
CPC ............ *B60K 1/04* (2013.01); *B62D 21/03* (2013.01); *B62D 21/157* (2013.01); *B62D 25/20* (2013.01); *B60K 6/22* (2013.01); *B60K 2001/0438* (2013.01); *B60Y 2200/91* (2013.01); *B60Y 2200/92* (2013.01); *Y10S 903/904* (2013.01)

(58) Field of Classification Search
CPC ........................................................ B60K 1/04
See application file for complete search history.

(56) References Cited

U.S. PATENT DOCUMENTS

| | | | |
|---|---|---|---|
| 5,388,885 A | 2/1995 | Warren | |
| 6,168,228 B1 | 1/2001 | Heinz et al. | |
| 6,604,781 B2 | 8/2003 | Uchida | |
| 9,673,433 B1 | 6/2017 | Pullalarevu et al. | |
| 2002/0153749 A1 | 10/2002 | Lee | |
| 2007/0052260 A1* | 3/2007 | Lassl ................... | B62D 21/157 296/187.12 |
| 2007/0126264 A1* | 6/2007 | Mizuma ................ | B60N 2/015 296/204 |
| 2007/0152474 A1 | 7/2007 | Lassl et al. | |
| 2009/0085375 A1 | 4/2009 | Fonseka et al. | |
| 2012/0019026 A1* | 1/2012 | Deng ................... | B60N 2/4235 296/193.02 |
| 2012/0181809 A1* | 7/2012 | Kuhl ................... | B62D 25/025 296/30 |
| 2013/0257097 A1* | 10/2013 | Kojo ..................... | B62D 21/15 296/187.08 |
| 2017/0088178 A1 | 3/2017 | Tsukada et al. | |

\* cited by examiner

*Primary Examiner* — James A Shriver, II
*Assistant Examiner* — James J Triggs
(74) *Attorney, Agent, or Firm* — Carlson, Gaskey & Olds, P.C.

(57) ABSTRACT

An exemplary reinforcement assembly includes, among other things, a heel kick that extends horizontally between rockers of an electrified vehicle, and a reinforcement bracket that horizontally overlaps with the heel kick and is secured to an outboard portion of the heel kick. An exemplary reinforcement method includes, among other things, resisting a load applied to a side of an electrified vehicle using a reinforcement bracket secured to an outboard portion of a heel kick. The heel kick extends horizontally between rockers of the electrified vehicle. The heel kick and the reinforcement bracket are horizontally overlapped with each other.

16 Claims, 5 Drawing Sheets

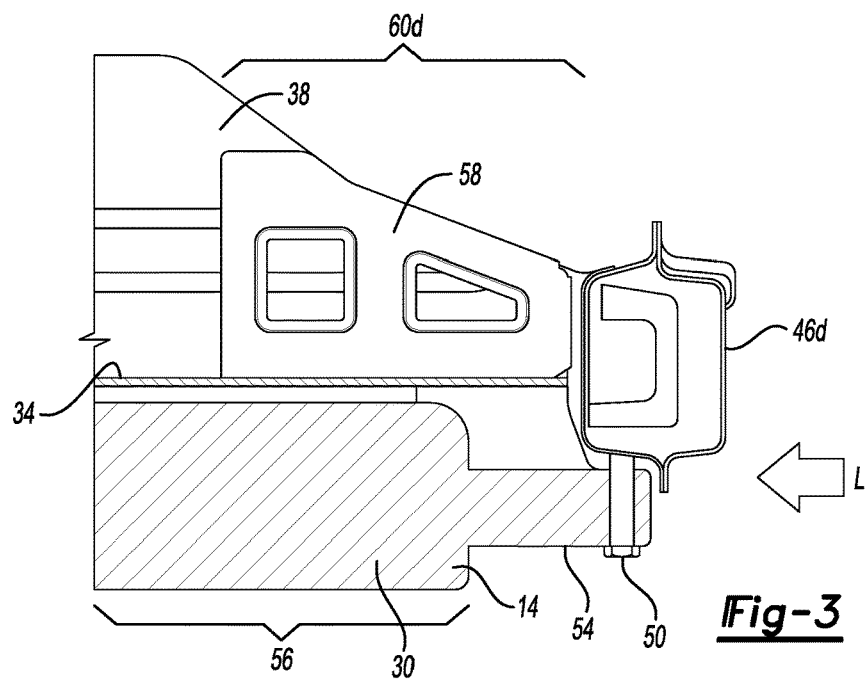
Fig-3
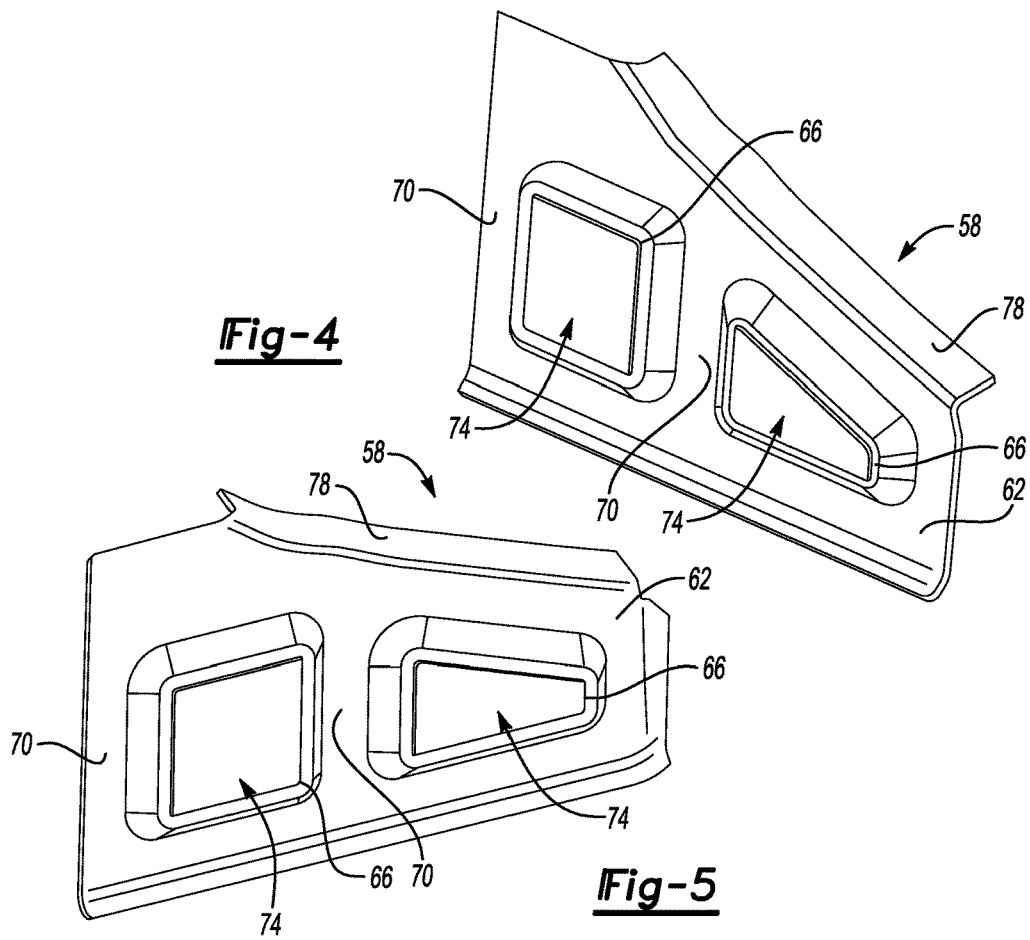
Fig-4
Fig-5

REINFORCED HEEL KICK ASSEMBLY AND HEEL KICK REINFORCEMENT METHOD

TECHNICAL FIELD

This disclosure relates generally to reinforcing a heel kick of a vehicle and, more particularly, to a reinforcing a heel kick of an electrified vehicle.

BACKGROUND

Electrified vehicles differ from conventional motor vehicles because electrified vehicles are selectively driven using one or more electric machines (i.e., electric motors and/or generators) powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery can be a relatively high voltage battery that selectively powers the electric machines and other electrical loads of the electrified vehicle. The traction battery can be mounted beneath an underbody structure of the electrified vehicle. Electrified vehicle battery systems may employ one or more battery modules that include a plurality of battery arrays. Each battery array includes a plurality of battery cells that are supported relative to one another and are interconnected electrically between battery cell terminals and interconnector bus bars.

SUMMARY

A reinforced assembly according to an exemplary aspect of the present disclosure includes, among other things, a heel kick that extends horizontally between rockers of an electrified vehicle, and a reinforcement bracket that horizontally overlaps with the heel kick and is secured to an outboard portion of the heel kick.

Another example of the foregoing assembly includes a rear floor and a mid-floor. The rear floor is vertically above the mid-floor. The heel kick extends vertically from the mid-floor to the rear floor.

Another example of any of the foregoing assemblies includes a traction battery of the electrified vehicle having a first portion with a first height beneath the mid-floor, and a second portion with a second, greater height beneath the rear floor. The heel kick and the reinforcement bracket are disposed in front of the second portion relative to an orientation of the electrified vehicle. The heel kick and the reinforcement bracket vertically overlap the second portion.

In another example of any of the foregoing assemblies, the reinforcement bracket is secured to a forward facing surface of the heel kick relative to an orientation of the electrified vehicle.

In another example of any of the foregoing assemblies, the mid-floor is a flat floor without a tunnel.

In another example of any of the foregoing assemblies, the reinforcement bracket is a first reinforcement bracket on a driver side outboard portion of the heel kick. The assembly further comprises a second reinforcement bracket on a passenger side outboard portion of the heel kick.

In another example of any of the foregoing assemblies, the reinforcement bracket is secured to a forward member of the heel kick having a first thickness, and the reinforcement bracket has a second thickness that is at least twice the first thickness.

In another example of any of the foregoing assemblies, the reinforcement bracket is welded directly to the forward member of the heel kick.

In another example of any of the foregoing assemblies, the reinforcement bracket includes at least one aperture.

In another example of any of the foregoing assemblies, the reinforcement bracket includes a horizontally extending flange that wraps over at least a portion of a vertically upward facing surface of the heel kick, a rear floor secured to the heel kick, a rear rail cap, or some combination of these.

In another example of any of the foregoing assemblies, the reinforcement bracket includes at least one vertical member positioned between apertures in the reinforcement bracket. A rectangular cross-section is provided on three sides by a corrugation within the heel kick, and on another side by a base of the reinforcement bracket.

In another example of any of the foregoing assemblies, the reinforcement bracket includes a base and one or more platforms each having an aperture. The base is secured directly to the heel kick. The platforms each extend horizontally from the base such that the respective aperture is horizontally spaced from the base.

In another example of any of the foregoing assemblies, the reinforcement bracket includes a base secured directly to the heel kick. The base includes apertures.

A reinforcement method according to another exemplary aspect of the present disclosure includes, among other things, resisting a load applied to a side of an electrified vehicle using a reinforcement bracket secured to an outboard portion of a heel kick. The heel kick extends horizontally between rockers of the electrified vehicle. The heel kick and the reinforcement bracket are horizontally overlapped with each other.

In another example of the foregoing method, the heel kick extends vertically from a rear floor to a mid-floor. The rear floor is vertically above the mid-floor.

Another example of any of the foregoing methods includes a traction battery of the electrified vehicle having a first portion with a first height beneath the mid-floor, and a second portion with a second, greater height beneath the rear floor. The heel kick and the reinforcement bracket are disposed in front of the second portion relative to an orientation of the electrified vehicle.

In another example of any of the foregoing methods, the mid-floor is a flat floor lacking a tunnel.

In another example of any of the foregoing methods, the side is a driver side of the vehicle and the outboard portion is a driver side outboard portion. The method further includes resisting a load applied to a passenger side of the vehicle using another reinforcement bracket secured to a passenger side outboard portion of the heel kick.

Another example of any of the foregoing methods includes welding the reinforcement bracket to the heel kick during the securing.

Another example of any of the foregoing methods includes directing the load about at least one aperture in the reinforcement bracket.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 illustrates a close-up, front view of a heel kick area of FIG. 2 reinforced with a reinforcement bracket.

FIG. 4 illustrates a perspective view of the reinforcement bracket from FIG. 3.

FIG. 5 illustrates another perspective view of the reinforcement bracket of FIG. 3.

DETAILED DESCRIPTION

This disclosure relates generally to reinforcing areas of a vehicle. In particular, the disclosure relates to a reinforcement bracket that reinforces a heel kick area of an electrified vehicle having a traction battery. The reinforcement bracket can strengthen the heel kick area, which can help the heel kick area withstand impact loads to protect the traction battery. Withstanding such impact loads can be particularly relevant to vehicles including a flat floor without a tunnel.

Figure 1:
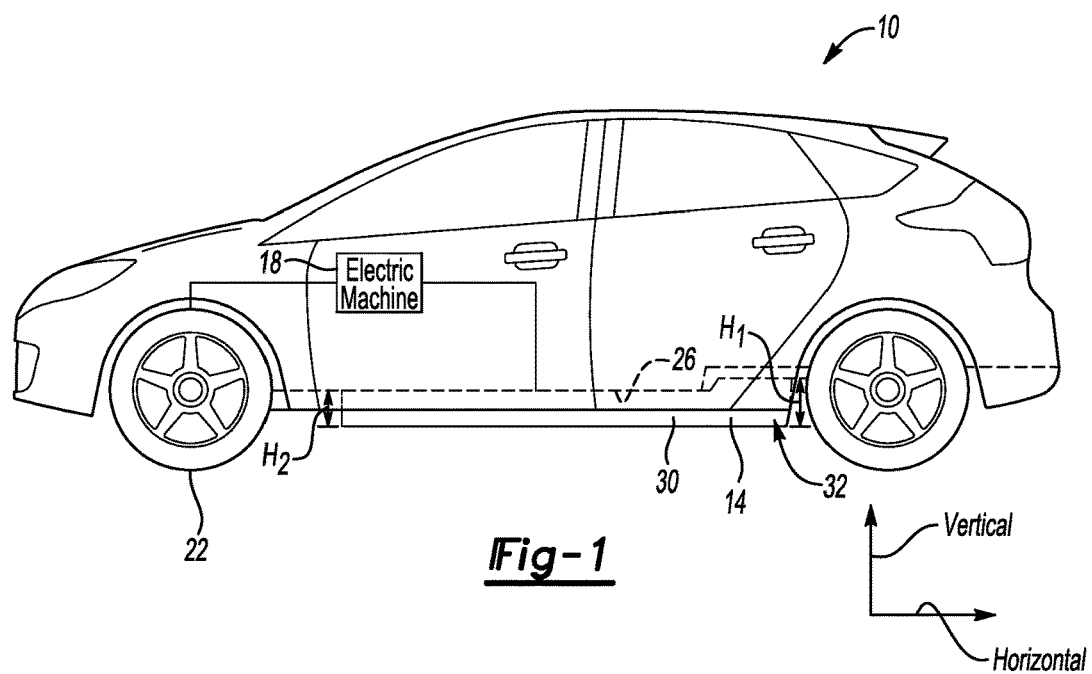
FIG. 1 illustrates a side view of an example electrified vehicle incorporating a reinforced heel kick according to an exemplary aspect of the present disclosure.

FIG. 1 illustrates a side view of an example electrified vehicle 10 including a traction battery 14, an electric machine 18, and drive wheels 22. The traction battery 14 can power the electric machine 18. When powered, the electric machine can drive the drive wheels 22. The electric machine 18 receives electric power from the traction battery 14 and converts the electric power to torque to drive the drive wheels 22. The example traction battery 14 is considered a relatively high-voltage battery.

The example electrified vehicle is an all-electric vehicle. In other examples, the electrified vehicle 10 is a hybrid electric vehicle, which selectively drives wheels using torque provided by an internal combustion engine instead of, or in addition to, the electric machine 18. Generally, the electrified vehicle 10 can be any type of vehicle having a traction battery.

The example electrified vehicle 10 includes an underbody structure 26. The traction battery 14 is mounted to the underbody structure 26 in a position vertically below the underbody structure 26.

Vertical and horizontal, for purposes of this disclosure, refer to the general orientation of the electrified vehicle 10 with respect to ground during ordinary operation of the electrified vehicle 10.

The traction battery 14 can include a plurality of battery arrays housed within an enclosure structure 30. A tray could be secured to a lid to provide the enclosure structure 30. The enclosure structure 30 is secured to the underbody structure 26 to secure the traction battery 14 relative to the electrified vehicle 10.

The example traction battery 14 includes a raised area 32 at an aft end portion of the traction battery 14 relative to an orientation of the electrified vehicle 10. The raised area 32 has a height $H_1$ that is greater than a height H2 of the remaining portions of the traction battery 14. The raised area 32 could, for example, house a top and bottom stack of battery arrays, whereas the remaining portions of the traction battery 14 house a bottom stack, but no top stack. The rear underbody structure 26 accommodates the raised area 32.

Figure 2:
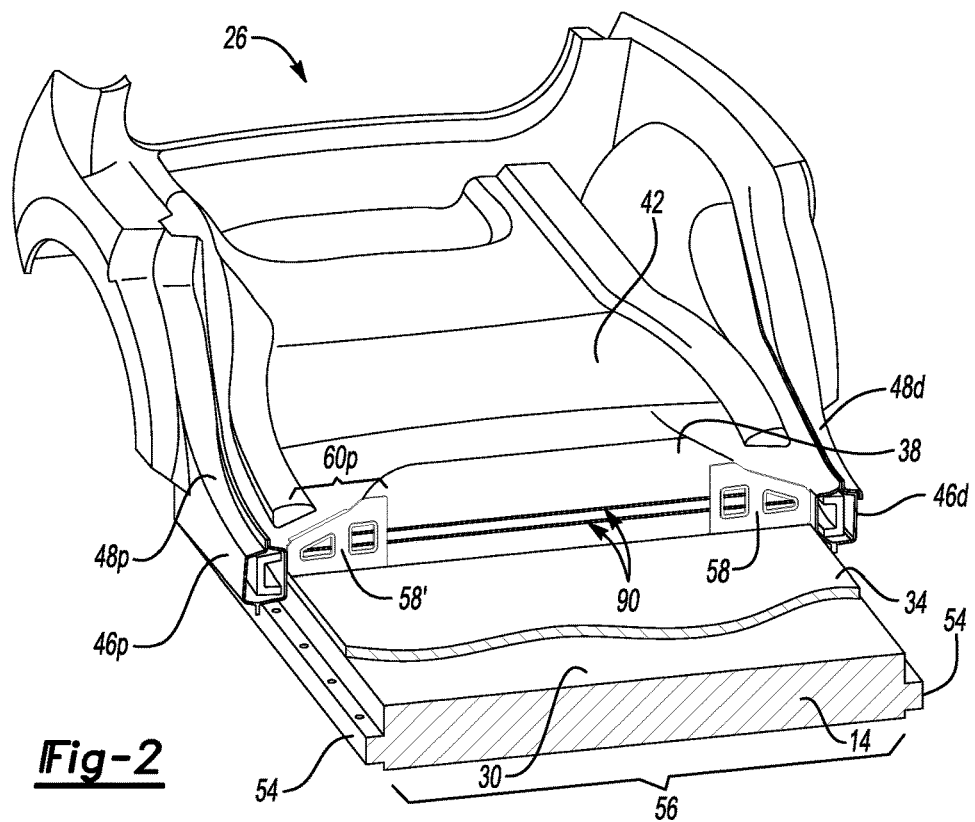
FIG. 2 illustrates a perspective and section view of selected portions of the electrified vehicle of FIG. 1.
Figure 6:
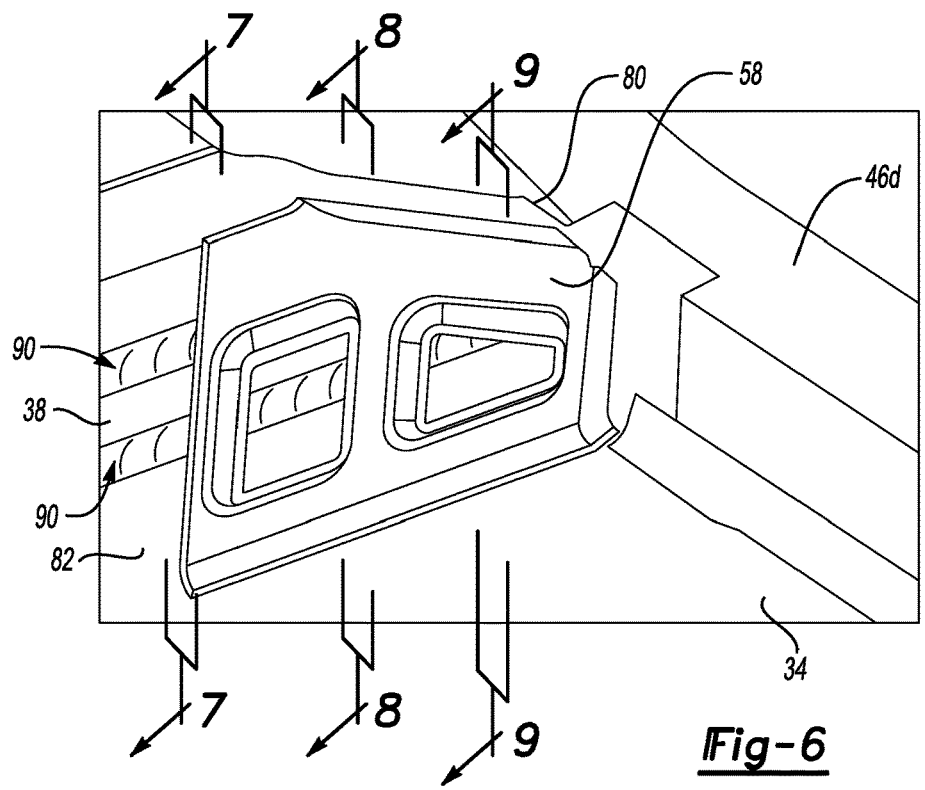
FIG. 6 illustrates a close-up, perspective view of the heel kick area of FIG. 3.
Figure 7:
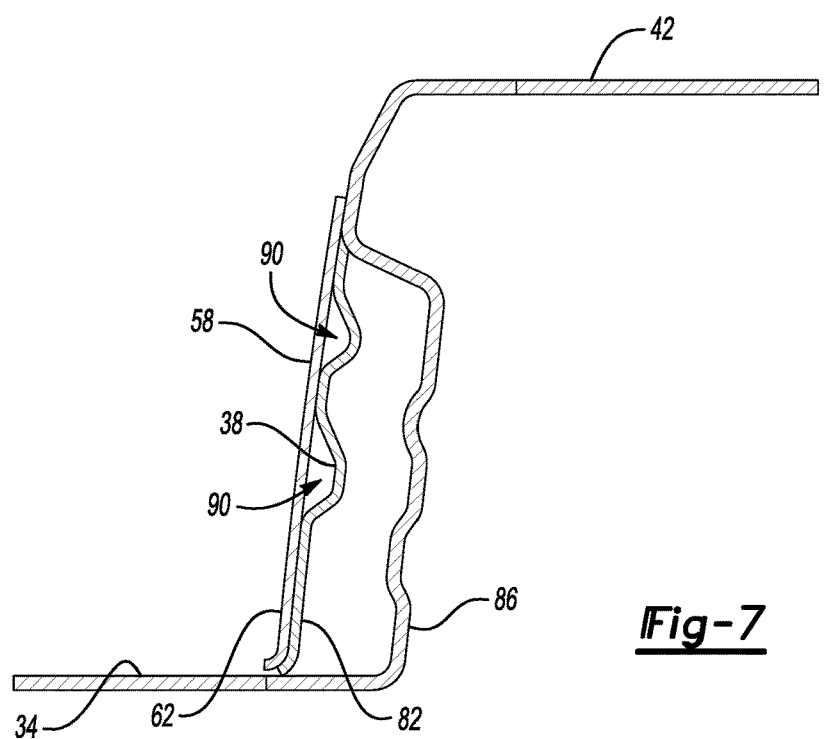
FIG. 7 illustrates a section taken along line 7-7 in FIG. 6.

With reference now to FIG. 2 and continued reference to FIG. 1, the underbody structure 26 includes, among other things, a mid-floor 34, a heel kick 38, a rear floor 42, a driver side rocker 46d, a passenger side rocker 46p, a driver side rear rail cap 48d, and a passenger side rear rail cap 48p. The mid-floor 34 is vertically below the rear floor 42. The heel kick 38 extends vertically from the mid-floor 34 to the rear floor 42. The heel kick 38 extends horizontally between the rockers 46d, 46p.

The exemplary mid-floor 34 has a flat floor architecture as the mid-floor 34 lacks a tunnel. The electric drivetrain of the electrified vehicle 10 makes possible the elimination of a transmission tunnel, which is prevalent in conventional vehicles. The flat floor architecture can be influenced by side impact loads more than architectures that include a tunnel.

The traction battery 14 extends horizontally from the driver side rocker 46d to the passenger side rocker 46p. The traction battery 14 include a portion vertically below the mid-floor 34 as well as a portion vertically below the rear floor 42. In this example, the raised area 32 is beneath the rear floor 42.

With reference now to FIG. 3 and continuing reference to FIG. 2, a plurality of mechanical fasteners 50 can be used to secure the traction battery 14 to the rockers 46d, 46p. In this exemplary embodiment, attachment members 54 of the traction battery 14 extends outward from a primary portion 56 of the enclosure structure 30. The mechanical fasteners 50 engage the attachment members 54 to attach the traction battery 14 to the rockers 46d, 46p.

The battery arrays are housed within the primary portion 56 of the enclosure structure 30. As can be appreciated, a load, such as a load resulting from a side impact to a driver side of the electrified vehicle 10, can deform the rocker 46d inwardly toward the primary portion 56 of the traction battery 14 housing the battery arrays. Such deformation can be undesirable. Among other things, the deformation could damage the traction battery 14, cause portions of the underbody structure 26 to contact the battery arrays, etc.

To inhibit such deformation, a reinforcement bracket 58 is secured to a driver side outboard portion 60d of the heel kick 38. The reinforcement bracket 58 strengthens areas of the underbody structure 26 near the reinforcement bracket 58 to mitigate and reduce intrusion due to a load, such as a load L applied to the driver side.

Another reinforcement bracket 58' is secured to a corresponding passenger side outboard portion 60p (FIG. 2). The reinforcement bracket 58' strengthens areas of the underbody structure 26 to, among other things, help these areas withstand an impact load applied to the passenger side. The reinforcement brackets 58, 58' horizontally overlap the heel kick plate 38.

The reinforcement bracket 58, in the exemplary embodiment extends laterally inward from the driver side rocker 46d to a position horizontally overlapping with the primary portion 56 of the traction battery 14. Similarly, the exemplary reinforcement bracket 58' extends laterally inward from the passenger side rocker 46p to a position overlapping with the primary portion 56. The reinforcement brackets 58, 58' are secured to the respective driver side and passenger side outboard portions 60d, 60p rather than along the entire heel kick 38 to, among other things, reduce weight.

The driver side outboard portion 60*d* represents, in this example, the approximately laterally outermost 20 percent of the heel kick 38 on the driver side. Similarly, the passenger side outboard portion 60*p* represents, in this example, the approximately laterally outermost 20 percent of the heel kick 38 on the passenger side. The sizes of the other outboard portions could vary in other examples.

Where the reinforcement brackets 58, 58' are secured to the respective outboard portions depends on the design environment. How far the reinforcement brackets 58, 58' extend laterally can also vary based on the design environment.

With reference now to FIGS. 4-9, the reinforcement bracket 58, in an exemplary non-limiting embodiment of the present disclosure, includes a base 62, a pair of platforms 66, vertical members 70, apertures 74, and a wraparound flange 78. The configuration of the reinforcement bracket 58' of FIG. 2 is substantially symmetrical to the reinforcement bracket 58.

The base 62 is secured directly to the heel kick 38. The reinforcement bracket 58 could be, for example, secured to the heel kick 38 by spot welding the base 62 to the heel kick 38.

The apertures 74 are defined within the platforms 66, which extend horizontally from the base 62. The platforms 66 extend horizontally toward a front of the electrified vehicle 10 (FIG. 1) relative to the base 62 in this exemplary embodiment. The platforms 66 provide a windowpane about the apertures 74. The vertical members 70 are positioned along horizontal sides of the apertures 74 and the platforms 66.

The apertures 74 are provided in a top surface of the platforms 66 such that the apertures 74 are horizontally spaced from the base 62, and horizontally spaced from a plane defined by the attachment points between the base 62 the heel kick 38. Incorporating the apertures 74 can reduce an overall weight of the reinforcement bracket 58. In another example, the platforms 66 are omitted and the apertures 74 are provided within the base 62. In such an example, the apertures 74 and the base 62 are disposed in a common plane.

The flange 78 is a horizontally extending flange that wraps over at least a portion of an upwardly facing surface of the underbody structure 26 when the reinforcement bracket 58 is installed. The flange 78 can be secured to an upwardly facing surface 80 of the heel kick 38, the rear floor 42, rear rail cap 48*d*, 48*p* or both. Spot welds could be used to attach the flange 78 to the upwardly facing surface 80.

Figure 8:
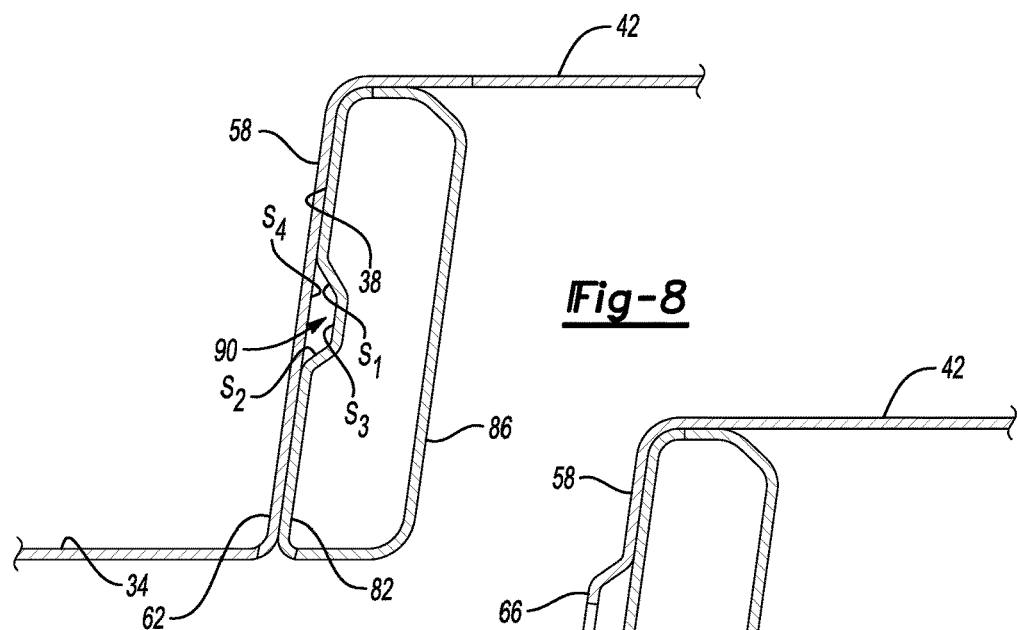
FIG. 8 illustrates a section taken along line 8-8 in FIG. 6.
Figure 9:
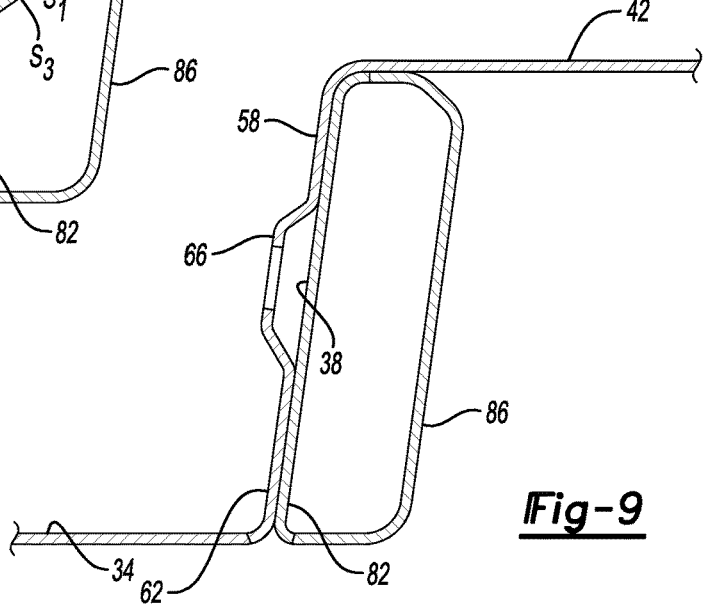
FIG. 9 illustrates a section taken along line 9-9 in FIG. 6.

The heel kick corrugations 90 forms a rectangular cross-section with the base 62 as shown in FIG. 8. The rectangular cross-section is provided on three sides $S_1$, $S_2$, and $S_3$, by the heel kick forward member 82, and on a fourth side $S_4$ by the base 62 of the bracket 58. The rectangular cross-section can enhance rigidity of the heel kick area of the underbody structure 26.

In the exemplary embodiment, the heel kick 38 includes a forward member 82 and a rearward member 86 to provide the heel kick 38 with a beam-type construction. The beam-type construction can strengthen the underbody structure 26, and particularly the heel kick 38. The heel kick 38 can be considered a kick-up cross-member in some examples.

In this exemplary embodiment, the forward member 82 of the heel kick 38 includes corrugations 90 that further strengthen the heel kick area. The corrugations 90 extend horizontally across areas of the heel kick 38. The heel kick 38 includes two corrugations 90 in this example, but other numbers of the corrugations 90 could be used. Notably, the corrugations 90 extend beneath the reinforcement bracket 58 and extend continuously to a position beneath the reinforcement bracket 58' (see FIG. 2).

The forward member 82 of the heel kick 38 has, in this example, a thickness of about 0.9 mm. The reinforcement bracket 58 has a thickness that is at least 1.8 mm. Thus, a thickness of the reinforcement bracket 58 is at least twice that of the heel kick 38 to which the reinforcement bracket 58 is secured. The forward member 82 and the heel kick 38 can be steel, for example, a high strength low alloy steel.

Figure 10:
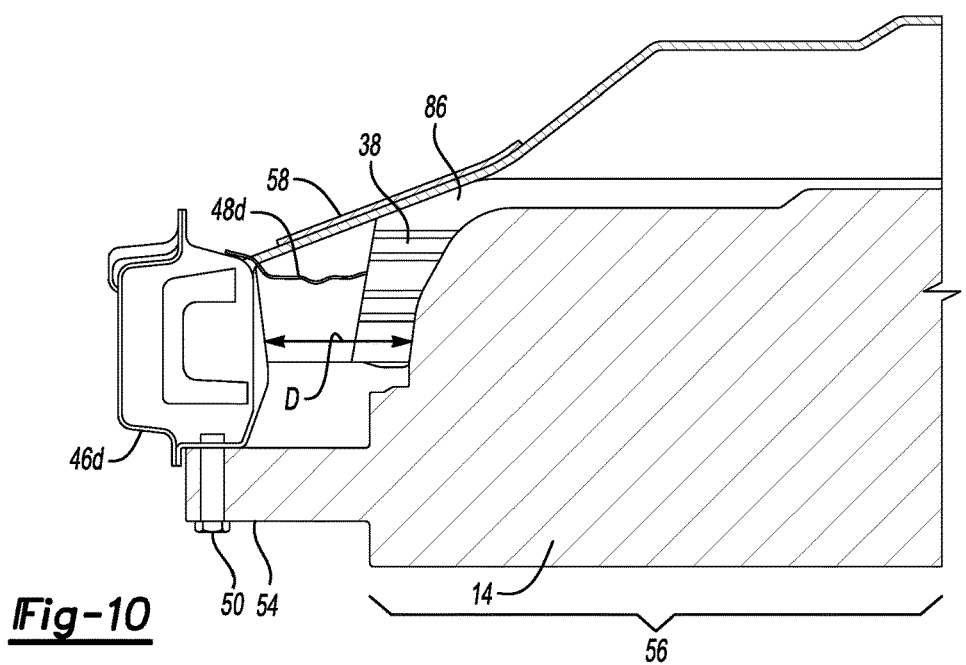
FIG. 10 illustrates a rear view of the heel kick area of FIG. 2.
Figure 11:
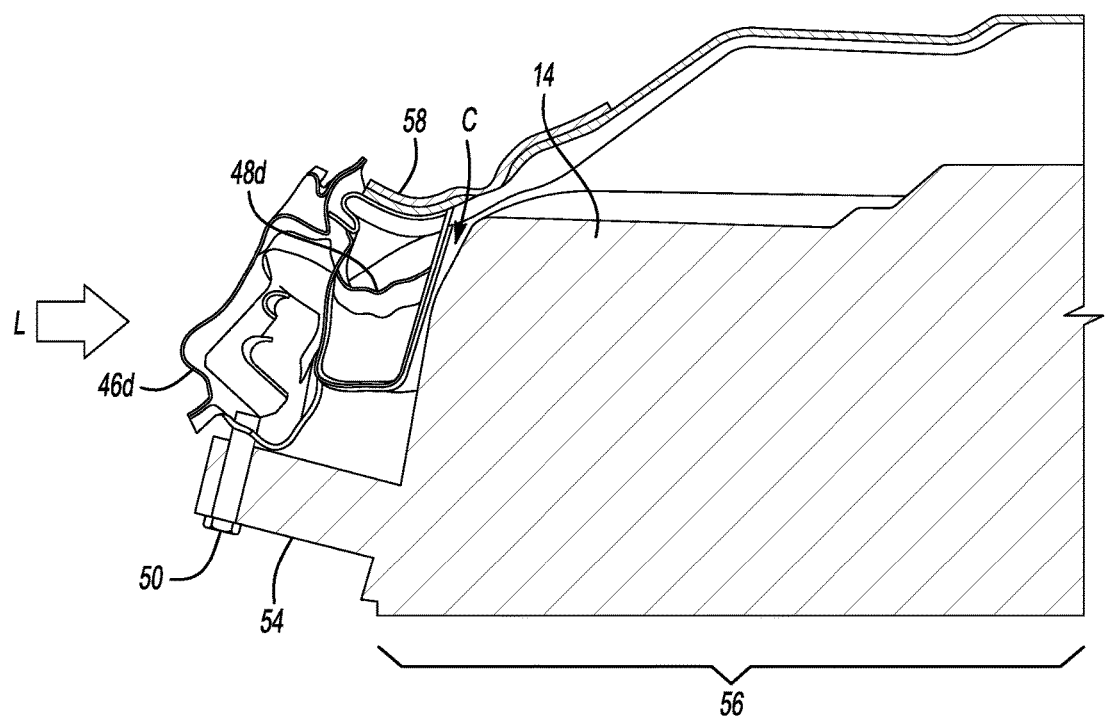
FIG. 11 illustrates the rear view of FIG. 10 after applying an impact load to a laterally facing side of the electrified vehicle.

Referring to FIG. 10, prior to a sufficient load applied to a driver side, the primary portion 56 of the traction battery 14 is spaced a distance D from the rocker 46*d* and rear rail cap 48*d*. Applying a load L causes the rocker 46*d* and rear rail cap 48*d* to move relatively toward the traction battery 14, which reduces the distance D. Notably, the rear rail cap 48*d* maintains clearance C to the primary portion 56 of the traction battery 14, which can protect the traction battery 14 from damage resulting from the load L.

The reinforcement bracket 58 can increase an axial rigidity of the heel kick 38 under the load L when compared to the heel kick 38 loaded without the reinforcement bracket 58. The reinforcement bracket 58 can further increase a bending strength of the heel kick 38, and can add torsional strength and rigidity to the rocker 46*d* and the rear rail cap 48*d*.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A reinforced assembly, comprising:
   a heel kick that extends horizontally between rockers of an electrified vehicle;
   a first reinforcement bracket that horizontally overlaps with the heel kick and is secured to an outboard portion of the heel kick, the first reinforcement bracket on a driver side outboard portion of the heel kick,
   wherein the first reinforcement bracket includes a horizontally extending flange that wraps over at least a portion of a vertically upward facing surface of the heel kick, at least a portion of a rear floor secured to the heel kick, or at least a portion of a rear rail cap; and
   a second reinforcement bracket on a passenger side outboard portion of the heel kick.

2. The reinforced assembly of claim 1, further comprising a rear floor and a mid-floor, the rear floor vertically above the mid-floor, the heel kick extending vertically from the mid-floor to the rear floor.

3. A reinforced assembly, comprising:
   a heel kick that extends horizontally between rockers of an electrified vehicle;
   a first reinforcement bracket that horizontally overlaps with the heel kick and is secured to an outboard portion of the heel kick, the first reinforcement bracket on a driver side outboard portion of the heel kick;
   a rear floor and a mid-floor, the rear floor vertically above the mid-floor, the heel kick extending vertically from the mid-floor to the rear floor; and
   a traction battery of the electrified vehicle having a first portion with a first height beneath the mid-floor, and a second portion with a second, greater height beneath the rear floor, the heel kick and the first reinforcement bracket disposed in front of the second portion relative to an orientation of the electrified vehicle, the heel kick and the first reinforcement bracket vertically overlapping the second portion.

4. The reinforced assembly of claim 2, wherein the first reinforcement bracket is secured to a forward facing surface of the heel kick relative to an orientation of the electrified vehicle.

5. The reinforced assembly of claim 2, wherein the mid-floor is a flat floor without a tunnel.

6. A reinforced assembly, comprising:
a heel kick that extends horizontally between rockers of an electrified vehicle; and
a reinforcement bracket that horizontally overlaps with the heel kick and is secured to an outboard portion of the heel kick, wherein the reinforcement bracket is secured to a forward member of the heel kick having a first thickness, and the reinforcement bracket has a second thickness that is at least twice the first thickness.

7. The reinforced assembly of claim 1, wherein the first reinforcement bracket is welded directly to the forward member of the heel kick.

8. The reinforced assembly of claim 1, wherein the first reinforcement bracket includes at least one aperture.

9. The reinforced assembly of claim 1, wherein the first reinforcement bracket includes at least one vertical member positioned between apertures in the first reinforcement bracket, wherein a rectangular cross-section is provided on three sides by a corrugation within the heel kick, and on another side by a base of the first reinforcement bracket.

10. The reinforced assembly of claim 1, wherein the first reinforcement bracket includes a base and one or more platforms each having an aperture, the base secured directly to the heel kick, the one or more platforms each extending horizontally from the base such that the aperture is horizontally spaced from the base.

11. The reinforced assembly of claim 10, wherein the first reinforcement bracket includes a base secured directly to the heel kick, the base including apertures.

12. A reinforcement method, comprising:
resisting a load applied to a side of an electrified vehicle using a reinforcement bracket secured to an outboard portion of a heel kick, the heel kick extending horizontally between rockers of the electrified vehicle, the heel kick and the reinforcement bracket horizontally overlapped with each other,
wherein the heel kick extends vertically from a mid-floor to rear floor, the rear floor vertically above the mid-floor,
wherein a traction battery of the electrified vehicle has a first portion with a first height beneath the mid-floor, and a second portion with a second, greater height beneath the rear floor, wherein the heel kick and the reinforcement bracket are disposed in front of the second portion relative to an orientation of the electrified vehicle.

13. The reinforcement method of claim 12, wherein the mid-floor is a flat floor lacking a tunnel.

14. The reinforcement method of claim 12, wherein the side is a driver side of the vehicle and the outboard portion is a driver side outboard portion, and further comprising resisting a load applied to a passenger side of the vehicle using another reinforcement bracket secured to a passenger side outboard portion of the heel kick.

15. The reinforcement method of claim 12, further comprising welding the reinforcement bracket to the heel kick during the securing.

16. The reinforcement method of claim 12, further comprising directing the load about at least one aperture in the reinforcement bracket.

* * * * *